(12) United States Patent
Berbee et al.

(10) Patent No.: US 10,017,589 B2
(45) Date of Patent: *Jul. 10, 2018

(54) LOW DENSITY ETHYLENE-BASED POLYMERS WITH HIGH MELT STRENGTH

(71) Applicant: Dow Global Technologies LLC, Midland, MI (US)

(72) Inventors: Otto J. Berbee, Hulst (NL); Cornelis F. J. Den Doelder, Terneuzen (NL); Teresa P. Karjala, Lake Jackson, TX (US); Karl Zuercher, Samstagern (CH); Jian Wang, Freeport, TX (US); Stefan Hinrichs, Wondelgem (BE)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,368

(22) Filed: Jul. 13, 2016

(65) Prior Publication Data

US 2016/0319053 A1 Nov. 3, 2016

Related U.S. Application Data

(63) Continuation of application No. 14/434,204, filed as application No. PCT/US2013/030459 on Mar. 12, 2013, now Pat. No. 9,394,389.

(60) Provisional application No. 61/728,341, filed on Nov. 20, 2012.

(51) Int. Cl.
| | | |
|---|---|---|
| *C08L 23/06* | (2006.01) | |
| *C08F 110/02* | (2006.01) | |
| *C08L 23/08* | (2006.01) | |
| *C09D 123/06* | (2006.01) | |
| *C09D 123/08* | (2006.01) | |

(52) U.S. Cl.
CPC ............ *C08F 110/02* (2013.01); *C08L 23/06* (2013.01); *C08L 23/0815* (2013.01); *C08L 23/0869* (2013.01); *C09D 123/06* (2013.01); *C09D 123/0815* (2013.01); *C09D 123/0869* (2013.01); *C08L 2205/02* (2013.01); *C08L 2205/025* (2013.01); *C08L 2207/066* (2013.01)

(58) Field of Classification Search
CPC .... C08F 110/02; C08L 23/08; C08L 23/0815; C08L 23/0869; C08L 2205/02; C08L 2205/035; C08L 2207/066; C09D 123/06; C09D 123/0815; C09D 123/0869
See application file for complete search history.

(56) References Cited

U.S. PATENT DOCUMENTS

| | | | | |
|---|---|---|---|---|
| 5,582,923 A | * | 12/1996 | Kale et al. | .......... B29C 47/0004 264/171.23 |
| 6,114,457 A | * | 9/2000 | Markel et al. | ........ C08F 255/00 525/240 |
| 6,545,094 B2 | * | 4/2003 | Oswald et al. | ..... C08L 23/0815 525/191 |
| 7,415,442 B1 | | 8/2008 | Battaglini et al. | |
| 7,820,776 B2 | | 10/2010 | Neuteboom et al. | |
| 8,729,186 B2 | | 5/2014 | Berbee et al. | |
| 8,871,876 B2 | | 10/2014 | Berbee et al. | |
| 9,120,880 B2 | | 9/2015 | Zschoch et al. | |
| 9,228,036 B2 | | 1/2016 | Berbee et al. | |
| 9,234,055 B2 | | 1/2016 | Berbee et al. | |
| 9,394,389 B2 | * | 7/2016 | Berbee et al. | ........ C08F 110/02 |
| 2007/0225445 A1 | | 9/2007 | Nguyen et al. | |
| 2008/0308296 A1 | * | 12/2008 | Smedberg et al. | ..... B32B 27/06 174/120 SR |
| 2009/0004489 A1 | * | 1/2009 | Laiho | ..................... B32B 27/06 428/461 |
| 2014/0316096 A1 | | 10/2014 | Berbee et al. | |

FOREIGN PATENT DOCUMENTS

| | | |
|---|---|---|
| EP | 0792318 A1 | 9/1997 |
| EP | 1777238 A1 | 4/2007 |
| EP | 2123707 B1 | 10/2010 |
| WO | 2011/019563 A1 | 2/2011 |
| WO | 2012/057975 A1 | 5/2012 |
| WO | 2013/095969 A1 | 6/2013 |
| WO | 2014/003837 A1 | 1/2014 |
| WO | 2014/179469 A2 | 11/2014 |
| WO | 2014/190036 A1 | 11/2014 |
| WO | 2014/190039 A1 | 11/2014 |
| WO | 2014/190041 A1 | 11/2014 |
| WO | 2015/094566 A1 | 6/2015 |

OTHER PUBLICATIONS

Bosch "The Introduction of Tubular LDPE to the Extrusion Coating Market and the Specifics of the Product" at the 12th TAPPI European Place Conference in 2009.
PCT/US2013/030459, 20130827, International Search Report and Written Opinion.
PCT/US2013/030459, 20150604, International Preliminary Report on Patentability.

* cited by examiner

Primary Examiner — Nathan M Nutter

(57) ABSTRACT

The invention provides a composition comprising a first ethylene-based polymer, formed by a high pressure, free-radical polymerization process, and comprising the following properties:
a) a Mw(abs) versus I2 relationship: $Mw(abs) < A \times [(I2)^B]$, where $A = 5.00 \times 10^2$ (g/mole)/(dg/min)$^B$, and $B = -0.40$; and
b) a MS versus I2 relationship: $MS \geq C \times [(I2)^D]$, where $C = 13.5$ cN/(dg/min)$^D$, and $D = -0.55$.

15 Claims, 6 Drawing Sheets

LOW DENSITY ETHYLENE-BASED POLYMERS WITH HIGH MELT STRENGTH

REFERENCE TO RELATED APPLICATIONS

This present application is a continuation of U.S. application Ser. No. 14/434,204, filed on Apr. 8, 2015, now U.S. Pat. No. 9,394,389, which is a 35 U.S.C. of § 371 of International Application No. PCT/US2013/030459, filed on Mar. 12, 2013, which claims the benefit of U.S. Provisional Application No. 61/728,341, filed on Nov. 20, 2012.

BACKGROUND

Low density polyethylene (LDPE) resins for extrusion coating and extrusion lamination on paper, board, aluminum, etc., are designed with broad MWD (molecular weight distribution) and low extractables. In extrusion coating applications, the polymer is processed at high temperature conditions, typically above 260° C. and below 350° C. Broad molecular weight distribution (MWD) resins with a very high molecular weight fraction are used for good processability during coating (neck-in and drawdown balance). Low extractables are needed to reduce undesirable taste and odor issues in the final product. Low extractables are also needed to reduce smoke formation during the processing of the resin, especially during coating processes run at high temperatures.

Typically LDPE resins with broad MWD are made using autoclave reactors or a combination of autoclave and tube reactors. Broad MWD resins can be achieved in autoclave reactors by promoting long chain branching, and through the inherent residence time distribution, by which molecules will undergo shorter (low molecular weight) or longer (high molecular weight) growth paths.

The autoclave and tubular reactor systems differ from each other in respect to residence time distribution, which is typically more uniform for tubular reactors and dispersed for autoclave reactor zones. Polymerization conditions like temperature, pressure and polymer concentrations vary widely in tubular reactor systems, and are uniform or are less differentiated for autoclave reactor systems.

The uniform residence time in tubular reactors leads to narrower MWD, therefore very broad MWD can only be achieved in tubular reactors by applying extremely differentiated polymerization conditions, for example, as described in International Application No. PCT/US12/064284 (filed Nov. 9, 2012), and/or application of a branching/cross-linking agent, for example, as described in U.S. Pat. No. 7,820,776. The use of extreme process conditions and/or branching/cross-linking agents can lead to high melt strength tubular, low density polyethylene suitable for extrusion coating applications. These tubular polyethylenes will have a specific composition (e.g. density), and functionality as determined by the applied process conditions, type and level of branching agent and/or comonomer. Undesirable gels in the polymer can be an issue, resulting from the use of branching or cross-linking agents.

In extrusion coating applications, the following product and application properties are, among others, of importance: coating performance at variable processing speeds, adhesion to the substrate, barrier properties, and seal formation. The coating performance at variable processing speeds will depend mainly on the viscoelastic properties of the polymer, while adhesion, barrier, and sealing properties will also depend, in addition to the viscoelastic properties, on the density and functionality of the polymer.

EP0792318A1, EP1777238A1, EP2123707A1, and EP2123707A1 describe compositions of polymers suitable for use in extrusion coating applications, in which the viscoelastic performance is contributed by an autoclave-based LDPE, as a minor blend component, and in which the overall density and the application performance are determined by the major (non-LDPE) blend component.

The autoclave blend components used in such compositions have melt strength properties exceeding the normal autoclave products used in non-blend extrusion coating applications, and are therefore even more difficult to match in a tubular LDPE process. This favorable viscoelastic performance of these autoclave blend components is achieved by extremely broad, and, in some cases, bimodal MWD. However, the presence of an ultra high molecular weight fraction in these resins has a negative impact on the optical appearance in the final extrusion coating application. Furthermore, an autoclave process typically operates at lower conversion levels, and is more capital/energy intensive than a tubular process.

Thus, there is a need for new ethylene-based polymers with broad MWD, which are suitable as a blend component in compositions to be used in extrusion coating applications (sufficient melt strength), but lacking the ultra high molecular weight fraction of broad MWD autoclave resins, and which can be made in a tubular process.

EP0792318A1 discloses an ethylene polymer composition comprising from about 75 to 95 percent, by weight, of at least one ethylene/α-olefin interpolymer, and about 5 to 25 percent, by weight, of at least one high pressure ethylene polymer. The ethylene/α-olefin interpolymer is selected from the group consisting of a substantially linear ethylene polymer, a homogeneously branched linear ethylene polymer and a heterogeneously branched linear ethylene polymer, wherein the ethylene/α-olefin polymer is characterized as having a density in the range of 0.85 g/cc to 0.940 g/cc. The high pressure ethylene polymer is characterized as having a melt index, $I_2$, less than 6.0 g/10 minutes, a density of at least 0.916 g/cc, a melt strength of at least 9 cN, a $M_w/M_n$ ratio of at least 7.0, and a bimodal molecular weight distribution as determined by gel permeation chromatography. The ethylene polymer extrusion composition has a melt index, $I_2$, of at least 1.0 g/10 minutes.

U.S. Pat. No. 7,776,987 discloses a composition based on low melt index LDPE (typically in the range of 0.2 to 1.0 g/10 min), in the amount of 10 to 25%, together with a high melt index linear polyethylene, where the melt index of the linear polyethylene is in the range of 20 to 100, preferably 30 to 40, and is suitable for use in extrusion coating. The composition comprises polymeric material having certain rheological and gel permeation chromatography (GPC) properties, and exhibits reduced neck-in when used in extrusion coating. This neck-in is independent of melt strength, thereby facilitating improved extrusion processes.

EP1777238A1 claims the use of an autoclave based LDPE with a melt index within the range of 2.5 to 10.0 g/10 minutes, with certain dynamic mechanical spectroscopy rheological properties, as a blend component in compositions suitable for extrusion coating applications. A related patent, EP2123707A1, discloses 2-30 wt % of the above autoclave LDPE in blends with a tubular LDPE having a melt index of 2 to 8.

US2007/0225445 discloses polymer blends composed of 25 to 75 wt % homopolymer LDPE, produced in a tubular reactor, and 75 to 25 wt % of ethylene homopolymer LDPE produced in a high pressure autoclave reactor, and provided that each homopolymer is removed from the reaction zone prior to being blended together. The blends, so formed, have a good combination of neck-in and adhesion properties. When the tubular product is blended with the autoclave product in blend ratios varying from 0.7:0.3 to 0.3:0.7, the neck-in of the polymer web varied between 165 to 95% versus the neck-in of the autoclave reference. The pure (100%) tubular neck-in was 305% times the neck-in of the autoclave reference.

The presentation of J. Bosch ("The Introduction of Tubular LDPE to the Extrusion Coating Market and the Specifics of the Product") at the 12$^{th}$ TAPPI European Place Conference, in 2009, discloses the differences between autoclave and tubular based resins, and the consequences on extrusion coating performance. Further this reference explains the need to develop non-blend, tubular resins for extrusion coating applications.

Conventional high melt strength ethylene-based polymers used in compositions suitable for extrusion coating are made in the autoclave process with very broad MWD and with the presence of an ultra high molecular weight fraction, which has a negative impact on the optical appearance in the final application. Furthermore, an autoclave process typically operates at lower conversion levels, and is more capital/energy intensive than a tubular process. Conventional tubular products lack melt strength to provide the desired viscoelastic properties to extrusion coating compositions made with these low melt strength resins.

Thus, there is a need for new ethylene-based polymers with high melt strength, which are suitable as a blend component in compositions to be used in extrusion coating applications, but lacking the ultra high molecular weight fraction of broad MWD autoclave resins, and which new polymers can be made in a tubular process. These needs and others have been met by the following invention.

SUMMARY OF INVENTION

The invention provides a composition comprising a first ethylene-based polymer, formed by a high pressure, free-radical polymerization process, and comprising the following properties:
a) a Mw(abs) versus I2 relationship: $Mw(abs) < A \times [(I2)^B]$, where $A = 5.00 \times 10^2$ (g/mole)/(dg/min)$^B$, and $B = -0.40$; and
b) a MS versus I2 relationship: $MS \geq C \times [(I2)^D]$, where $C = 13.5$ cN/(dg/min)$^D$, and $D = -0.55$.

BRIEF DESCRIPTION OF THE DRAWINGS

FIG. 3 is a double logarithmic plot.

FIG. 4 is a double logarithmic plot.

FIG. 5 is a double logarithmic plot.

DETAILED DESCRIPTION

Figure 1:
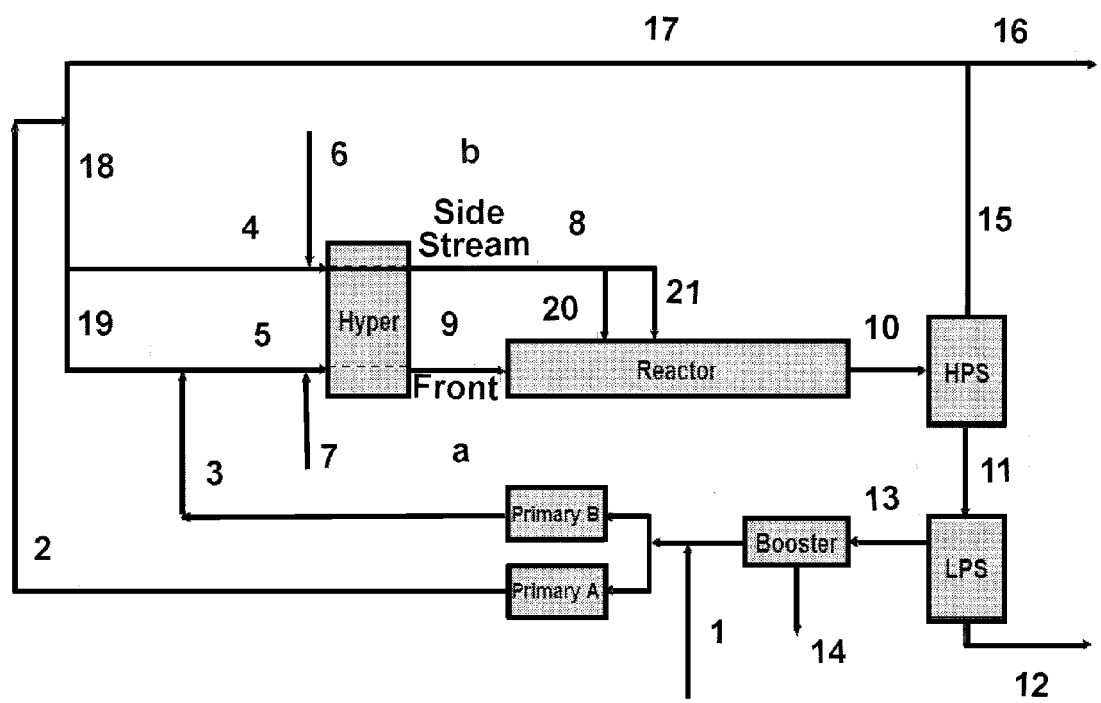
FIG. 1 is a schematic of a polymerization flow scheme.

As discussed above, the invention provides a composition comprising a first ethylene-based polymer, formed by a high pressure, free-radical polymerization process, comprising the following properties:
a) a Mw(abs) versus I2 relationship: $Mw(abs) < A \times [(I2)^B]$, where $A = 5.00 \times 10^2$ (g/mole)/(dg/min)$^B$, and $B = -0.40$; and
b) a MS (Melt Strength) versus I2 relationship: $MS \geq C \times [(I2)^D]$, where $C = 13.5$ cN/(dg/min)$^D$, and $D = -0.55$.

The composition may comprise a combination of two or more embodiments described herein.

In feature a) above, the Mw(abs) is determined by GPC Method A as described herein.

In feature b) above, the Melt Strength (MS) is determined at 190° C.; see test method described herein.

In one embodiment, the first ethylene-based polymer has a melt index (I2) from 0.1 g/10 min to 6.0 g/10 min (ASTM 2.16 kg/190° C.).

In one embodiment, the first ethylene-based polymer has a melt index (I2) from 0.2 g/10 min to 6.0 g/10 min, further from 0.3 g/10 min to 6.0 g/10 min (ASTM 2.16 kg/190° C.).

In one embodiment, the first ethylene-based polymer has a melt index (I2) from 0.4 g/10 min to 6.0 g/10 min, further from 0.5 g/10 min to 6.0 g/10 min (ASTM 2.16 kg/190° C.).

In one embodiment, the first ethylene-based polymer has a melt index (I2) from 0.1 to less than 4.0 g/10 min.

In one embodiment, the first ethylene-based polymer has a melt index (I2) from 0.3 to 6.0 g/10 min.

In one embodiment, the first ethylene-based polymer has a melt index (I2) from 0.3 to less than 4.0 g/10 min.

In one embodiment, the first ethylene-based polymer has b) a Mw(abs) versus I2 relationship: $Mw(abs) < A \times [(I2)^B]$, where $A = 4.25 \times 10^2$ (g/mole)/(dg/min)$^B$, and $B = -0.40$ (Mw (abs) by GPC method A).

In one embodiment, the first ethylene-based polymer has b) a Mw(abs) versus I2 relationship: $Mw(abs) < A \times [(I2)^B]$, where $A = 3.50 \times 10^2$ (g/mole)/(dg/min)$^B$, and $B = -0.40$ (Mw (abs) by GPC method A).

In one embodiment, the first ethylene-based polymer has a c) a MS versus I2 relationship: $MS \geq C \times [(I2)^D]$, where $C = 14.5$ cN/(dg/min)$^D$, and $D = -0.55$ (Melt Strength=MS, 190° C.).

In one embodiment, the first ethylene-based polymer has a c) a MS versus I2 relationship: $MS \geq C \times [(I2)^D]$, where $C = 15.5$ cN/(dg/min)$^D$, and $D = -0.55$ (Melt Strength=MS, 190° C.).

In one embodiment, the first ethylene-based polymer has a G' value greater than, or equal to, 140 Pa, at 170° C., further greater than, or equal to, 150 Pa, at 170° C., further greater than, or equal to, 160 Pa, at 170° C.

In one embodiment, the first ethylene-based polymer has a melt strength greater than, or equal to, 9.0 cN, at 190° C., further greater than, or equal to, 12.0 cN, at 190° C., further greater than, or equal to, 15.0 cN, at 190° C.

In one embodiment, the first ethylene-based polymer has a "weight fraction (w) of molecular weight greater than $10^6$ g/mole, based on the total weight of polymer, as determined by GPC(abs), that meets the following relationship: w<E×[(I2)$^F$], where E=0.110 (dg/min)$^{-F}$, and F=−0.38 (GPC Method A).

In one embodiment, the first ethylene-based polymer has a "weight fraction (w) of molecular weight greater than $10^6$ g/mole, based on the total weight of polymer, as determined by GPC(abs), that meets the following relationship: w<E×[(I2)$^F$], where E=0.090 (dg/min)$^{-F}$, and F=−0.38 (GPC Method A).

In one embodiment, the first ethylene-based polymer has a "weight fraction (w) of molecular weight greater than $10^6$ g/mole, based on the total weight of polymer, as determined by GPC(abs), that meets the following relationship: w<E×[(I2)$^F$], where E=0.075 (dg/min)$^{-F}$, and F=−0.38 (GPC Method A).

In one embodiment, the first ethylene-based polymer is polymerized in at least one tubular reactor. In a further embodiment, the first ethylene-based polymer is polymerized in a tubular reactor system that does not comprise an autoclave reactor.

In one embodiment, the composition further comprises a second ethylene-based polymer. In a further embodiment, the composition has a melt index (I2) from 2 to 50 g/10 min, further from 3 to 35 g/10 min, and further 4 to 20 g/10 min. In one embodiment, the composition has a density from 0.900 to 0.955 g/cc. In one embodiment, the composition has a MS value greater than, or equal to, 2.5 cN (at 190° C.).

In one embodiment, the second ethylene-based polymer has a density from 0.860 to 0.960 g/cc, further from 0.870 to 0.955 g/cc, further from 0.880 to 0.950 g/cc.

In one embodiment, the second ethylene-based polymer has a melt index from 2 to 80 g/10 min, further from 4 to 50 g/10 min, further from 6 to 35 g/10 min.

In one embodiment, the second ethylene-based polymer is a polyethylene homopolymer. In a further embodiment, the polyethylene homopolymer has a density from 0.915 to 0.935 g/cc, further from 0.915 to 0.932 g/cc, further from 0.915 to 0.930 g/cc.

In one embodiment, the second ethylene-based polymer is a LDPE homopolymer with a density greater than, or equal to, 0.924 g/cc (1 cc=1 cm$^3$).

The second ethylene-based polymer may comprise a combination of two or more embodiments as described herein.

In one embodiment, the second ethylene-based polymer comprises at least one comonomer selected from a C3-C20 alpha-olefin, an acrylate, an acetate, a carboxylic acid, carbon monoxide, or an ionomer.

In one embodiment, the second ethylene-based polymer comprises at least one comonomer selected from a C3-C10 alpha-olefin, an acrylate, an acetate, a carboxylic acid, or carbon monoxide.

In one embodiment, the second ethylene-based polymer is selected from an ethylene/alpha-olefin copolymer, a low density polyethylene (LDPE), a high density polyethylene (HDPE), or a combination thereof.

Suitable second ethylene-based polymers include DOWLEX Polyethylene Resins, ELITE Enhanced Polyethylenes (for example, ELITE 5815 Enhanced Polyethylene), AFFINITY Polyolefin Plastomers, ENGAGE Polyolefin Elastomers, ASPUN Polyethylene, AMPLIFY Functional Polymers, and INFUSE Olefin Block Copolymers.

Linear low density polyethylenes (LLDPEs) include copolymers of ethylene with one or more alpha-olefins, such as, but not limited to, propylene, butene-1, pentene-1, 4-methylpentene-1, pentene-1, hexene-1 and octene-1.

In one embodiment, the composition further comprises a functionalized ethylene-based polymer. Suitable functionalized ethylene-based polymers include maleic anhydride grafted ethylene-based polymers, for example AMPLIFY TY Functional Polymers.

In one embodiment, the composition further comprises a propylene-based polymer. Suitable propylene-based polymers include VERSIFY Plastomers and Elastomers.

In one embodiment, the composition has a density from 0.900 to 0.955 g/cc, further from 0.900 to 0.950 g/cc.

In one embodiment, the composition has a melt index (I2) from 2 to 50 g/10 min, further from 3 to 35 g/10 min, and further 4 to 20 g/10 min.

In one embodiment, the composition has a G' value greater than, or equal to, 80 Pa, at 170° C., further greater than, or equal to, 90 Pa, at 170° C., further greater than, or equal to, 100 Pa, at 170° C.

In one embodiment, the composition has a MS value greater than, or equal to, 2.5 cN, at 190° C., further greater than, or equal to, 3.0 cN, at 190° C., further greater than, or equal to, 3.5 cN, at 190° C.

In one embodiment, the composition comprises "greater than 0 wt %," but less than 15 wt %, of the first ethylene-based polymer, based on the sum of the weight of first and second polymers, and wherein the composition has a G' value greater than, or equal to, 80 Pa (at 170° C.).

In one embodiment, the composition comprises "greater than 0 wt %," but less than 40 wt %, of the first ethylene-based polymer, based on the sum of the weight of first and second polymers, and wherein the composition has a G' value greater than, or equal to, 80 Pa (at 170° C.).

The composition may comprise a combination of two or more embodiments as described herein.

The first ethylene-based polymer may comprise a combination of two or more embodiments as described herein.

In one embodiment, the first ethylene-based polymer is selected from a polyethylene homopolymer or an ethylene-based interpolymer.

In one embodiment, in the first ethylene-based polymer is selected from a polyethylene homopolymer or an ethylene-based copolymer; and wherein the comonomer of the ethylene-based copolymer is selected from a vinyl acetate, an alkyl acrylate, carbon monoxide, an acrylic acid, a carboxylic acid-containing comonomer, an ionomer, a mono olefin, or selected from a vinyl acetate, an alkyl acrylate, acrylic acid, or a mono olefin. In a further embodiment, the comonomer is present in an amount from 0.5 to 30 wt % comonomer, based on weight of copolymer.

In one embodiment, the first ethylene-based polymer comprises less than 30 mole ppm of a crosslinking agent (able to form a covalent bond or linkage between two polymer molecules) or a comonomer with crosslinking capability (able to form a covalent bond or linkage between two polymer molecules), based on total moles of monomer units in the ethylene-based polymer. In a further embodiment, the first ethylene-based polymer comprises less than 30 ppm of a comonomer containing multiple unsaturations or containing an acetylenic functionality.

It is understood that trace amounts of impurities can be incorporated into the polymer structure; for example, low trace acetylenic components (less than 20 mol ppm in polymer) can be present in the ethylene feed according to typical specifications for ethylene (for example, acetylene at a maximum 5 mol ppm in the ethylene supply).

In one embodiment, the first ethylene-based polymer comprises less than 10 mole ppm incorporated propylene, based on the total moles of monomeric units in the ethylene-based polymer.

Desirably, the first ethylene-based polymer has low gels. Thus, the direct addition of crosslinking agents or comonomers with crosslinking capability is not desired in the polymerizations of the first ethylene-based polymers described herein.

In one embodiment, the first ethylene-based polymer has an I2≥0.5 g/10 min.

In one embodiment, the first ethylene-based polymer has an I2≥1 g/10 min.

In one embodiment, the first ethylene-based polymer has an I2≤10 g/10 min.

In one embodiment, the first ethylene-based polymer has an I2≤6 g/10 min.

In one embodiment, the first ethylene-based polymer has an I2≤5 g/10 min.

In one embodiment, the ethylene-based polymer has an I2≤4 g/10 min.

In one embodiment, the first ethylene-based polymer has a G'≥120 Pa, further G'≥130 Pa (at 170° C.), further G'≥140 Pa (at 170° C.), further G'≥150 Pa (at 170° C.).

In one embodiment, the first ethylene-based polymer has a density from 0.910 to 0.940 g/cc (1 cc=1 cm$^3$).

In one embodiment, the first ethylene-based polymer has a density greater than, or equal to, 0.915 g/cc, or greater than, or equal to, 0.918 g/cc.

An inventive first ethylene-based polymer may comprise a combination of two or more embodiments as described herein.

In one embodiment, the composition has a "neck-in" value≤120 mm, at a set temperature=290° C., a coating weight=25 g/m$^2$ and a line speed=300 m/min.

In one embodiment, the composition has a "draw-down" value≥400 m/min, at a set temperature=290° C. Draw down is defined as the maximum line speed attainable before web breakage or web defects/edge inconsistencies occur, when accelerating the line speed at a constant polymer output. The constant polymer output level is set by a coating weight of 15 g/m$^2$, running at 100 m/min line speed. Neck-in is the difference between the final width of the web and the die width at fixed line speed.

An inventive composition may comprise a combination of two or more embodiments as described herein.

The first ethylene-based polymer may comprise a combination of two or more embodiments as described herein.

The invention also provides an article comprising at least one component formed from an inventive composition.

In one embodiment, the article is selected from coatings, films, foams, laminates, fibers, or tapes.

In one embodiment, the article is an extrusion coating. In another embodiment, the article is a film.

An inventive article may comprise a combination of two or more embodiments as described herein.

The invention also provides a method for forming an inventive composition, said method comprising polymerizing ethylene in a reactor configuration that comprises at least one tubular reactor. In a further embodiment, the tubular reactor comprises at least two reaction zones. In a further embodiment, the tubular reactor comprises at least three reaction zones.

An inventive method may comprise a combination of two or more embodiments as described herein.

Polymerizations

For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor).

The pressure in each autoclave and tubular reactor zone of the process is typically from 100 to 400, more typically from 120 to 360, and even more typically from 150 to 320 MPa.

The polymerization temperature in each tubular reactor zone of the process is typically from 100 to 400° C., more typically from 130 to 360° C., and even more typically from 140 to 330° C.

The polymerization temperature in each autoclave reactor zone of the process is typically from 150 to 300° C., more typically from 165 to 290° C., and even more typically from 180 to 280° C. One skilled in the art understands that the temperatures in the autoclave are considerably lower and less differentiated than those of the tubular reactor, and thus, more favorable extractable levels are typically observed in polymers produced in an autoclave-based reactor systems.

The high pressure process of the present invention to produce polyethylene homo or interpolymers having the advantageous properties as found in accordance with the invention, is preferably carried out in a tubular reactor having at least three reaction zones.

Initiators

The process of the present invention is a free radical polymerization process. The type of free radical initiator to be used in the present process is not critical, but preferably one of the initiators applied, should allow high temperature operation in the range from 300° C. to 350° C. Free radical initiators that are generally used include organic peroxides, such as peresters, perketals, peroxy ketones, percarbonates and cyclic multifunctional peroxides. These organic peroxy initiators are used in conventional amounts, typically from 0.005 to 0.2 wt % based on the weight of polymerizable monomers.

Other suitable initiators include azodicarboxylic esters, azodicarboxylic dinitriles and 1,1,2,2-tetramethylethane derivatives, and other components capable of forming free radicals in the desired operating temperature range.

Peroxides are typically injected as diluted solutions in a suitable solvent, for example, in a hydrocarbon solvent.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agents (CTA)

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence, the molecular weight, for example, the number average molecular weight, Mn. The melt flow index (MFI or $I_2$) of a polymer, which is related to Mn, is controlled in the same way.

The chain transfer agents used in the process of this invention include, but are not limited to, aliphatic and olefinic hydrocarbons, such as pentane, hexane, cyclohexane, propene, pentene or hexene; ketones such as acetone, diethyl ketone or diamyl ketone; aldehydes such as formaldehyde or acetaldehyde; and saturated aliphatic aldehyde alcohols such as methanol, ethanol, propanol or butanol. The chain transfer agent may also be a monomeric chain transfer agent. For example, see WO 2012/057975, U.S. 61/579,067 (see International Application No. PCT/US12/068727 filed Dec. 10, 2012) and U.S. 61/664,956 (filed Jun. 27, 2012).

A further way to influence the melt-index includes the build up and control, in the ethylene recycle streams, of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents.

Polymers

In one embodiment, the first ethylene-based polymers of this invention have a density from 0.912 to 0.935, more typically from 0.914 to 0.930 and even more typically from 0.916 to 0.926, grams per cubic centimeter (g/cc or g/cm$^3$). In one embodiment, the ethylene-based polymers of this invention have a melt index ($I_2$) from 0.3 to 6 grams per 10 minutes (g/10 min) at 190° C./2.16 kg, further from 0.5 to 5 grams per 10 minutes (g/10 min) at 190° C./2.16 kg.

Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), ethylene methacrylic acid (EMAA), and ethylene carbon monoxide (ECO). Other suitable comonomers are described in Ehrlich, P.; Mortimer, G. A.; Adv. Polymer Science; Fundamentals of Free-radical Polymerization of Ethylene; Vol. 7, pp. 386-448 (1970). In one embodiment, comonomers exclude comonomers capable of crosslinking polymer chains, for instance containing multiple unsaturations or an acetylenic functionality.

Monomer and Comonomers

The term ethylene interpolymer as used in the present description and the claims refer to polymers of ethylene and one or more comonomers. Suitable comonomers to be used in the ethylene polymers of the present invention include, but are not limited to, ethylenically unsaturated monomers, and especially $C_{3-20}$ alpha-olefins, carbon monoxide, vinyl acetate, and $C_{2-6}$ alkyl acrylates. In one embodiment, the ethylene-based polymer does not contain comonomers capable of crosslinking polymer chains, for instance comonomers containing multiple unsaturations or containing an acetylenic functionality.

Blends

The inventive polymers can be blended with one or more other polymers, such as, but not limited to, high pressure copolymers and terpolymers, including grafted copolymers and grafted terpolymers; linear low density polyethylene (LLDPE); copolymers of ethylene with one or more alpha-olefins, such as, but not limited to, propylene, butene-1, pentene-1,4-methylpentene-1, pentene-1, hexene-1 and octene-1; high density polyethylene (HDPE), such as HDPE grades HD 940-970 available from The Dow Chemical Company. The amount of inventive polymer in the blend can vary widely, but typically it is from 5 to 90, or from 10 to 85, or from 15 to 80, weight percent, based on the weight of the polymers in the blend.

Additives

One or more additives may be added to a composition comprising an inventive polymer. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers; and oil extenders, including paraffinic or napthelenic oils.

Applications

An inventive composition may be employed in a variety of conventional thermoplastic fabrication processes to produce useful articles, including extrusion coatings; films; and molded articles, such as blow molded, injection molded, or rotomolded articles; foams; wire and cable, fibers, and woven or non-woven fabrics.

Definitions

Unless stated to the contrary, implicit from the context, or customary in the art, all parts and percents are based on weight and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra. Trace amounts of impurities may be incorporated into and/or within a polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene based on the weight of the polymer and, optionally, may comprise at least one comonomer.

The term "ethylene-based interpolymer" or "ethylene interpolymer" refers to an interpolymer that comprises a majority amount of polymerized ethylene based on the weight of the interpolymer, and comprises at least one comonomer.

The term "ethylene-based copolymer" or "ethylene copolymer" refers to an interpolymer that comprises a majority amount of polymerized ethylene based on the weight of the copolymer, and only one comonomer (thus, only two monomer types).

The terms "autoclave-based products" or "autoclaved-based polymers," as used herein, refer to polymers prepared in a reactor system comprising at least one autoclave reactor.

The phrase "high pressure, free-radical polymerization process," as used herein, refers to a free radical initiated polymerization carried out at an elevated pressure of at least 1000 bar (100 MPa).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density:

Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index:

Melt index, or $I_2$, (grams/10 minutes or dg/min) is measured in accordance with ASTM D 1238, Condition 190° C./2.16 kg. $I_{10}$ is measured with ASTM D 1238, Condition 190° C./10 kg.

GPC Method A: Triple Detector Gel Permeation Chromatography (TDGPC):

High temperature 3Det-GPC analysis was performed on an ALLIANCE GPCV2000 instrument (Waters Corp.) set at 145° C. The flow rate for the GPC was 1 mL/min. The injection volume was 218.5 μL. The column set consists of four Mixed-A columns (20-μm particles; 7.5×300 mm; Polymer Laboratories Ltd).

Detection was achieved by using an IR4 detector from PolymerChAR, equipped with a CH-sensor; a Wyatt Technology Dawn DSP MALS detector (Wyatt Technology Corp., Santa Barbara, Calif., USA), equipped with a 30-mW argon-ion laser operating at λ=488 nm; and a Waters three-capillary viscosity detector. The MALS detector was calibrated by measuring the scattering intensity of the TCB solvent. Normalization of the photodiodes was done by injecting SRM 1483, a high density polyethylene with weight-average molecular weight (Mw) of 32,100 g/mol and polydispersity (MWD) of 1.11. HDPE SRM 1483 was obtained from the U.S. National Institute of Standards and Technology (Gaithersburg, Md., USA). A specific refractive index increment (dn/dc) of −0.104 mL/mg, for polyethylene in TCB, was used.

The conventional GPC calibration was done with 20 narrow PS standards (Polymer Laboratories Ltd.) with molecular weights in the range from 580 to 7,500,000 g/mol. The polystyrene standard peak molecular weights were converted to polyethylene molecular weights using the following equation:

$$M_{polyethylene} = A \times (M_{polystyrene})^B,$$

with A=0.39, B=1. The value of A was determined by using a linear high density polyethylene homopolymer (HDPE) with Mw of 115,000 g/mol. The HDPE reference material was also used to calibrate the IR detector and viscometer by assuming 100% mass recovery and an intrinsic viscosity of 1.873 dL/g.

Distilled "Baker Analyzed" grade 1,2,4-trichlorobenzene (J. T. Baker, Deventer, The Netherlands), containing 200 ppm of 2,6-di-tert-butyl-4-methylphenol (Merck, Hohenbrunn, Germany), was used as the solvent for sample preparation, as well as for the 3Det-GPC experiment.

LDPE solutions were prepared by dissolving the samples under gentle stirring for three hours at 160° C. The PS standards were dissolved under the same conditions for 30 minutes. The sample concentration for the 3Det-GPC experiment was 1.5 mg/mL, and the polystyrene concentrations were 0.2 mg/mL.

A MALS detector measures the scattered signal from polymers or particles in a sample under different scattering angles θ. The basic light scattering equation (from M. Anderson, B. Wittgren, K.-G. Wahlund, Anal. Chem. 75, 4279 (2003)) can be written as follows:

$$\sqrt{\frac{Kc}{R_\theta}} = \sqrt{\frac{1}{M} + \frac{16\pi^2}{3\lambda^2}\frac{1}{M}Rg^2\sin^2\left(\frac{\theta}{2}\right)},$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and λ is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from the initial slope of the curve. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software was used to collect the signals from the IR detector, the viscometer, and the MALS detector, and to run the calculations.

The calculated molecular weights, e.g. Mw(abs), and molecular weight distributions (e.g., Mw(abs)/Mn(abs)) were obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards, such as Standard Reference Materials (SRM) 1475a, 1482a, 1483, or 1484a. The chromatographic concentrations are assumed low enough to eliminate addressing $2^{nd}$ virial coefficient effects (concentration effects on molecular weight).

The obtained MWD(abs) curve from TD-GPC was summarized with three characteristic parameters: Mw(abs), Mn(abs), and w, where w is defined as "weight fraction of molecular weight greater than $10^6$ g/mole, based on the total weight of polymer, and as determined by GPC(abs)."

Figure 2:
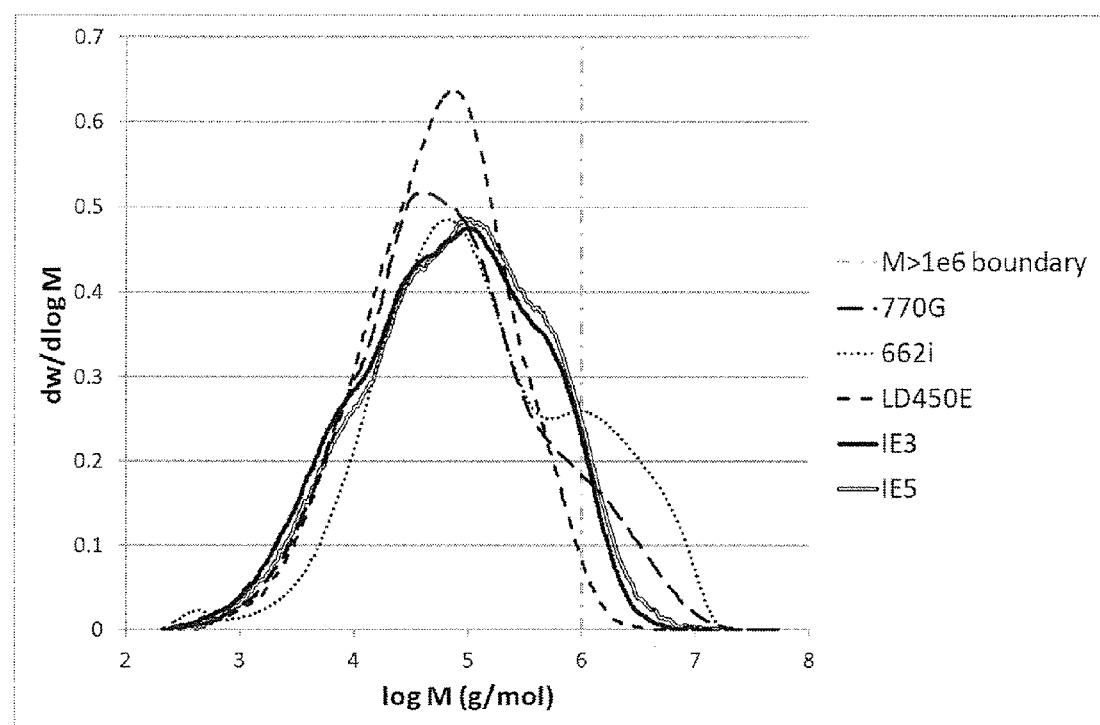
FIG. 2 depicts GPC the chromatograms for inventive LDPE (IE3, IE5) and comparative LDPE (770G, 662I, LD450E) polymers.
Figure 3:
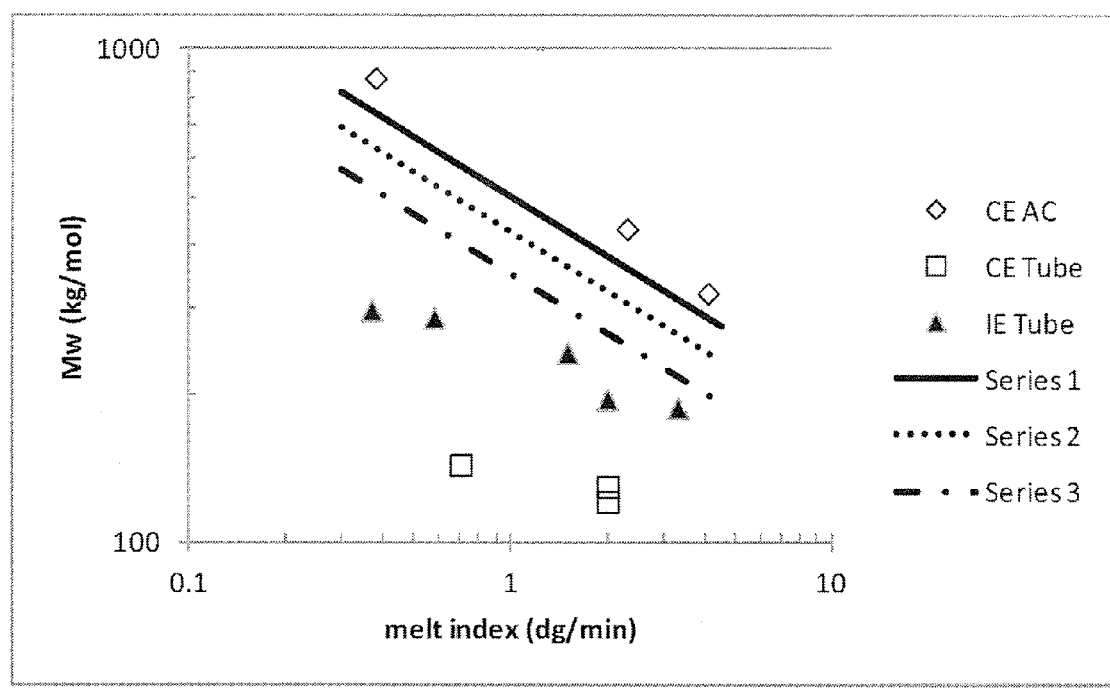
FIG. 3 depicts the "weight average molecular weight (Mw) versus melt index (I2)" for inventive and comparative polymers. The lines for series 1, 2 and 3 show the boundaries belonging to the following values selected for A, namely, $5.00 \times 10^2$, $4.25 \times 10^2$ and $3.50 \times 10^2$, respectively.
Figure 4:
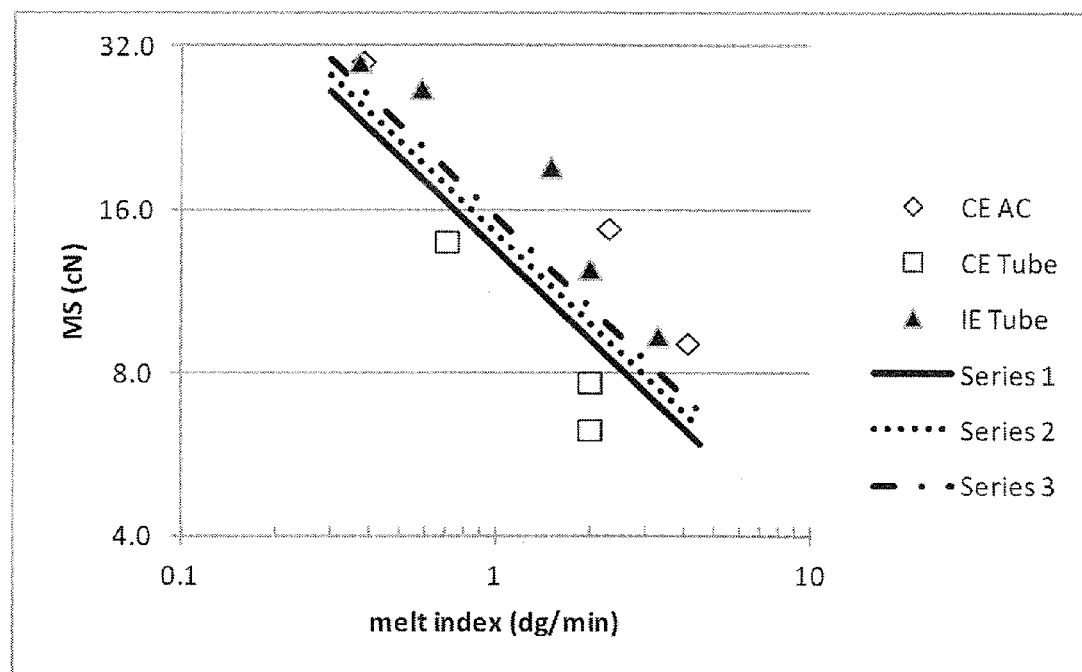
FIG. 4 depicts the "Melt Strength (MS) versus melt index (I2)" for inventive and comparative polymers. The lines for series 1, 2 and 3 show the boundaries belonging to the following values selected for C, namely, 13.5, 14.5 and 15.5, respectively.
Figure 5:
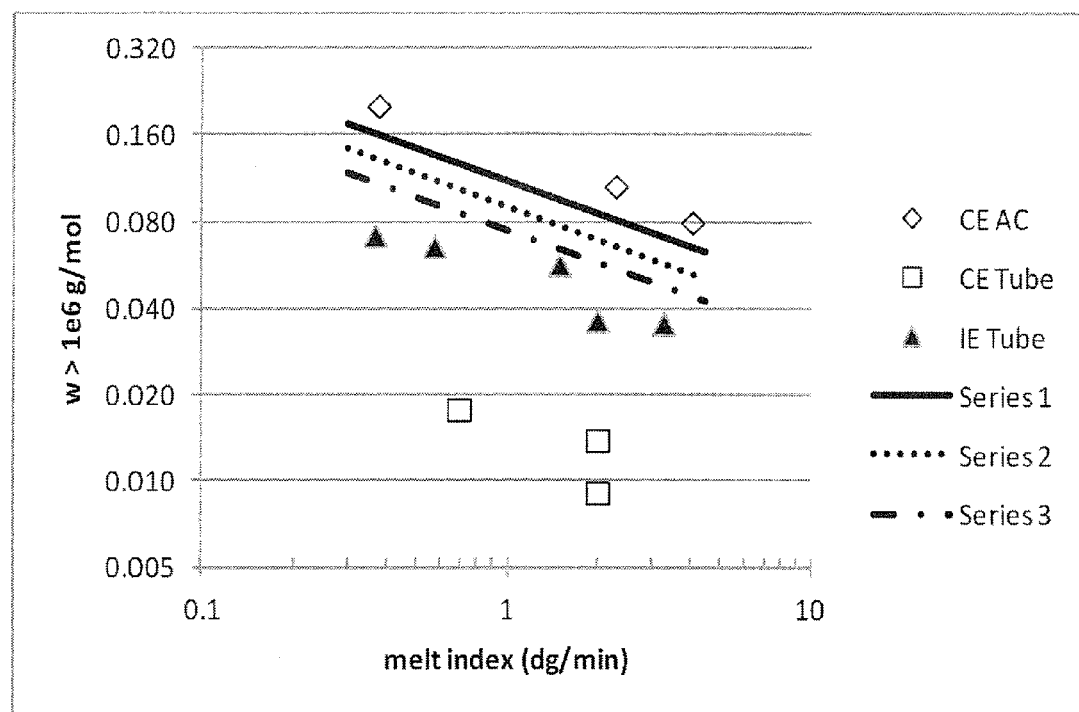
FIG. 5 depicts the "weight fraction of molecular weight greater than $10^6$ g/mole (w) versus melt index (I2)" for inventive and comparative polymers. The lines for series 1, 2 and 3 show the boundaries belonging to the following values selected for E, namely, 0.110, 0.090 and 0.075, respectively.

FIG. 2 shows the MWD(abs) for several comparative examples and Inventive Examples 3 and 4. In addition, a vertical line, as shown in this figure, indicates the lower integration limit to determine "w." Thus, "w" effectively is the area under the curve to the right of this vertical line.

In equation form, the parameters are determined as follows. Numerical integration from the table of "log M" and "dw/d log M" is typically done with the trapezoidal rule:

$$Mw(\text{abs}) = \int_{-\infty}^{\infty} M \frac{dw}{d\log M} d\log M,$$

$$Mn(\text{abs}) = \frac{1}{\int_{-\infty}^{\infty} \frac{1}{M} \frac{dw}{d\log M} d\log M}, \text{ and}$$

$$w = \int_{6}^{\infty} \frac{dw}{d\log M} d\log M.$$

The g' parameter is defined as the weight-average ratio of the intrinsic viscosity of the LDPE and the intrinsic viscosity of the linear HDPE reference material discussed above (Mw of 115,000 g/mole).

GPC Method B: Triple Detector Gel Permeation Chromatography (TDGPC)—Conventional GPC Data A Triple Detector Gel Permeation Chromatography (3D-GPC or TDGPC) system consisting of a Polymer Laboratories (now Agilent) high temperature chromatograph Model 220, equipped with a 2-angle laser light scattering (LS) detector Model 2040 (Precision Detectors, now Agilent), an IR-4 infra-red detector from Polymer Char (Valencia, Spain), and a 4-capillary solution viscometer (DP) (Viscotek, now Malvern) was used. Data collection was performed using Polymer Char DM 100 data acquisition box and related software (Valencia, Spain). The system was also equipped with an on-line solvent degassing device from Polymer Laboratories (now Agilent).

High temperature GPC columns consisting of four 30 cm, 20 um mixed A LS columns from Polymer Laboratories (now Agilent) were used. The sample carousel compartment was operated at 140° C., and the column compartment was operated at 150° C. The samples were prepared at a concentration of 0.1 grams of polymer in 50 milliliters of solvent. The chromatographic solvent and the sample preparation solvent was 1,2,4-trichlorobenzene (TCB) containing 200 ppm of 2,6-di-tert-butyl-4methylphenol (BHT). The solvent was sparged with nitrogen. The polymer samples were gently stirred at 160° C. for four hours. The injection volume was 200 microliters. The flow rate through the GPC was set at 1.0 ml/minute.

Column calibration and sample molecular weight calculations were performed using Polymer Char "GPC One" software. Calibration of the GPC columns was performed with 21 narrow molecular weight distribution polystyrene standards. The molecular weights of the polystyrene standards ranged from 580 to 8,400,000 g/mol, and were arranged in 6 "cocktail" mixtures, with at least a decade of separation between the individual molecular weights.

The peak molecular weights of polystyrene standards were converted to polyethylene molecular weights using the following equation (as described in Williams and Ward, J. Polym. Sci., Polym. Let., 6, 621 (1968)):

$$M_{polyethylene} = A(M_{polystyrene})^B$$

Here B has a value of 1.0, and the experimentally determined value of A is around 0.38 to 0.44.

The column calibration curve was obtained by fitting a first order polynomial to the respective polyethylene-equivalent calibration points obtained from the above Equation to the observed elution volumes.

Number, weight, and z-average molecular weights were calculated according to the following equations:

$$\overline{Mn} = \frac{\sum_i Wf_i}{\sum_i (Wf_i/M_i)}, \overline{Mw} = \frac{\sum_i (Wf_i * M_i)}{\sum_i Wf_i}, \overline{Mz} = \frac{\sum_i (Wf_i * M_i^2)}{\sum_i (Wf_i * M_i)},$$

where, $Wf_i$ is the weight fraction of the i-th component and $M_i$ is the molecular weight of the i-th component. The molecular weight distribution (MWD) is expressed as the ratio of the weight average molecular weight (Mw) to the number average molecular weight (Mn).

The A value was determined by adjusting the A value in the Williams and Ward Equation, until Mw, the weight average molecular weight, calculated using the above Equation, and the corresponding retention volume polynomial agreed with the independently determined value of Mw, obtained in accordance with the linear homopolymer reference with known weight average molecular weight of 115, 000 g/mol.

Rheological G'

The sample used in the G' measurement was prepared from a compression molding plaque. A piece of aluminum foil was placed on a backplate, and a template or mold was placed on top of the backplate. Approximately 12 grams of resin was placed in the mold, and a second piece of aluminum foil was placed over the resin and mold. A second backplate was then placed on top of the aluminum foil. The total ensemble was put into a compression molding press, which was run at the following conditions: 3 min at 150° C., at 10 bar pressure, followed by 1 min at 150° C., at 150 bar, followed by a "1.5 min" quench cooling to room temperature, at 150 bar. A 25 mm disk was stamped out of the compression-molded plaque. The thickness of this disk was approximately 2.0 mm.

The rheology measurement to determine G' was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 1.65 mm. The sample was then allowed to remain for exactly 5 minutes at these conditions. The oven was then opened, the excess sample was carefully trimmed around the edge of the plates, and the oven was closed. The storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale. The Y-axis scale covered the range from 10 to 1000 Pa, while the X-axis scale covered the range from 100 to 1000 Pa. For Software A, an Orchestrator software, was used to select the data in the region where G" was between 200 and 800 Pa (or using at least 4 data points). The data were fit to a log polynomial model using the fit equation Y=C1+C2 ln(x). Using the Orchestrator software, G', at G" equal to 500 Pa, was determined by interpolation.

For software B, data was interpolated using the Akima spline interpolation algorithm with the 3rd order piecewise polynomial fits. This is described in detail in Hiroshi Akima "A new method of interpolation and smooth curve fitting based on local procedures", J. ACM, 17(4), 589-602 (1970).

In some cases, the G' (at a G" of 500 Pa) was determined from test temperatures of 150° C. and 190° C. The value at 170° C. was calculated from a linear interpolation from the values at these two temperatures.

Melt Strength

Melt strength measurements were conducted on a Gottfert Rheotens 71.97 (Göettfert Inc.; Rock Hill, S.C.) attached to a Gottfert Rheotester 2000 capillary rheometer. A polymer melt (about 20-30 grams, pellets) was extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston was run at a constant piston speed of 0.265 mm/second. The standard test temperature was 190° C. The sample was drawn uniaxially to a set of accelerating nips located 100 mm below the die, with an acceleration of 2.4 mm/second$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Nuclear Magnetic Resonance ($^{13}$C NMR)

Samples were prepared by adding approximately "3 g of a 50/50 mixture of tetrachloroethane-d2/orthodichlorobenzene, containing 0.025 M Cr(AcAc)$_3$," to a "0.25 to 0.40 g polymer sample," in a 10 mm NMR tube. Oxygen was removed from the sample by placing the open tubes in a nitrogen environment for at least 45 minutes. The samples were then dissolved and homogenized by heating the tube, and its contents to 150° C., using a heating block and heat gun. Each dissolved sample was visually inspected to ensure homogeneity. Samples were thoroughly mixed, immediately prior to analysis, and were not allowed to cool before insertion into the heated NMR sample holders.

All data were collected using a Bruker 400 MHz spectrometer. The data was acquired using a six second pulse repetition delay, 90-degree flip angles, and inverse gated decoupling, with a sample temperature of 125° C. All measurements were made on non-spinning samples in locked mode. Samples were allowed to thermally equilibrate for seven minutes prior to data acquisition. The $^{13}$C NMR chemical shifts were internally referenced to the EEE triad at 30.0 ppm. The C6+ value was a direct measure of C6+ branches in LDPE, where the long branches were not distinguished from chain ends. The 32.2 ppm peak, representing the third carbon from the end of all chains or branches of six or more carbons, was used to determine C6+ value.

Nuclear Magnetic Resonance ($^1$H NMR)

Sample Preparation

The samples were prepared by adding approximately 130 mg of sample to "3.25 g of 50/50, by weight, tetrachlorethane-d2/perchloroethylene" with 0.001 M Cr(AcAc)$_3$ in a NORELL 1001-7, 10 mm NMR tube. The samples were purged by bubbling N2 through the solvent, via a pipette inserted into the tube, for approximately five minutes, to prevent oxidation. Each tube was capped, sealed with TEFLON tape, and then soaked at room temperature, overnight, to facilitate sample dissolution. The samples were kept in a N2 purge box, during storage, before, and after preparation, to minimize exposure to O2. The samples were heated and vortexed at 115° C. to ensure homogeneity.

Data Acquisition Parameters

The 1H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 4 scans, SWH 10,000 Hz, AQ 1.64 s, D1 14 s. The double presaturation experiment was run with a modified pulse sequence, TD 32768, 100 scans, DS 4, SWH 10,000 Hz, AQ 1.64 s, D1 1 s, D13 13 s.

Data Analysis—1H NMR Calculations

The signal from residual 1H in TCE-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two to obtain a value representing X thousands of carbons (i.e., if the polymer integral=28000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives moles unsaturated groups per 1000 moles of carbons.

EXPERIMENTAL

A. First Ethylene-Based Polymers

Inventive (IE1)

The polymerization was carried out in tubular reactor with three reaction zones. In each reaction zone, pressurized water was used for cooling and/or heating the reaction medium, by circulating this water through the jacket of the reactor. The inlet-pressure was 2100 bar, and the pressure drop over the whole tubular reactor system was about 300 bars Each reaction zone had one inlet and one outlet. Each inlet stream consisted of the outlet stream from the previous reaction zone and/or an added ethylene-rich feed stream. The ethylene was supplied according a specification, which allowed a trace amount (maximum of 5 mol ppm) of acetylene in the ethylene. Thus, the maximum, potential amount of incorporated acetylene in the polymer is less than, or equal to, 16 mole ppm, based on the total moles of monomeric units in the ethylene-based polymer (see conversion level in Table 3). The non-converted ethylene, and other gaseous components in the reactor outlet, were recycled through a high pressure and a low pressure recycles, and were compressed and distributed through a booster, a primary and a hyper (secondary) compressors, according flow scheme shown in FIG. 1. Organic peroxides were fed into each reaction zone (see Table 1). Acetone was used as a chain transfer agent, and it was present in each reaction zone inlet originating from the low pressure and high pressure recycle flows (#13 and #15), as well as from freshly injected CTA make-up stream #7 and/or stream #6. The polymer was made at a melt index of 3.3 g/10 min.

After reaching the first peak temperature (maximum temperature) in reaction zone 1, the reaction medium was cooled with the help of the pressurized water. At the outlet of the reaction zone 1, the reaction medium was further cooled by injecting a fresh, cold, ethylene-rich feed stream (#20), and the reaction was re-initiated by feeding an organic peroxide. This process was repeated at the end of the second reaction zone, to enable further polymerization in the third reaction zone. The polymer was extruded and pelletized (about 30 pellets per gram), using a "single screw" extruder at a melt temperature around 230-250° C. The weight ratio of the ethylene-rich feed streams (9:20:21) to the three reaction zones was 1.00:0.75:0.25. The R2 and R3 values were each 2.22. The R values are calculated according to U.S. Provisional Application No. 61/548,996 (International Patent Application PCT/US12/059469, filed Oct. 10, 2012). Rn (n=reaction zone number, n>1) is the ratio of "mass fraction of fresh ethylene fed to the first reaction zone (RZ1)" to "mass fraction of fresh ethylene fed to the nth reaction zone (RZn)" or Rn=RZ1/RZn. The internal process velocity was approximately 12.5, 9 and 11 msec for respectively the $1^{st}$ $2^{nd}$ and $3^{rd}$ reaction zones.

In this inventive example, the weight ratio of the CTA make-up streams #7 and #6 was 3.6. Additional information can be found in Tables 2 and 3.

Inventive 2 (IE2)

The polymerization was carried out in tubular reactor with three reaction zones, as discussed above. The peak temperatures were slightly adjusted, and the melt-index was lowered to 2.0. In this inventive example, the weight ratio of the CTA (acetone) make-up streams #7 and #6 was 1.1. Additional information can be found in Tables 2 and 3.

Inventive 3 (IE3)

The polymerization was carried out in tubular reactor with three reaction zones, as discussed above, with the exemption that both discharge streams (2 and 3) of the primary compressor were sent to the reactor front feed stream 4. The weight ratio of the ethylene-rich feed streams (9:20:21) to the three reaction zones was 1.00:0.75:0.25. The polymer was made at a melt index of 1.5 g/10 min.

The R2 and R3 values each approached infinity (∞). In this inventive example, the weight ratio of the CTA make-up streams #7 and #6 was 0.09. Additional information can be found in Tables 2 and 3. The CTA was propionaldehyde (PA).

Inventive 4 (IE4)

The polymerization was carried out in tubular reactor with three reaction zones, as discussed above, with the exemption that both discharge streams (2 and 3) of the primary compressor were sent to the reactor front feed stream 4. The weight ratio of the ethylene-rich feed streams (9:20:21) to the three reaction zones was 1.00:0:0. The polymer was made at a melt index of 0.58 g/10 min.

The R2 and R3 values each approached infinity (∞). In this inventive example, the weight ratio of the CTA make-up streams #7 and #6 was 2. Additional information can be found in Tables 2 and 3. The CTA was propionaldehyde (PA).

Inventive 5 (IE5)

The polymerization was carried out in tubular reactor with three reaction zones, as discussed above, with the exemption that both discharge streams (2 and 3) of the primary compressor were sent the reactor front feed stream 4. The weight ratio of the ethylene-rich feed streams (9:20:21) to the three reaction zones was 1.00:0:0. The polymer was made at a melt index of 0.37 g/10 min.

The R2 and R3 values each approached infinity (∞). In this inventive example, the weight ratio of the CTA make-up streams #7 and #6 was 1.35. Additional information can be found in Tables 2 and 3. The CTA was propionaldehyde (PA).

In summary, to achieve tubular resins with high melt strength, suitable as blend component in extrusion coating compositions, typically together with a low or lower melt strength component, the polymerization conditions need to be carefully selected and balanced Important process parameters include maximum polymerization temperatures, inlet reactor pressure, conversion level, and the type, level and distribution of the chain transfer agent.

TABLE 1

| Initiators | |
| --- | --- |
| Initiator | Abbreviation |
| tert-butyl peroxy-2-ethyl hexanoate | TBPO |
| di-tert-butyl peroxide | DTBP |
| 3,6,9-triethyl-3,6,9-trimethyl-1,4,7-peroxonane | TETMP |

TABLE 2

Pressure and Temperature Conditions (Inventive Examples)

| LDPE Exs. | Type | Inlet-pressure/ bar | Start-temp./ ° C. | reinitiation temp. 2nd zone/° C. | reinitiation temp. 3rd zone/° C. | 1st Peak temp./ ° C. | 2nd Peak temp./ ° C. | 3rd Peak temp./ ° C. |
| --- | --- | --- | --- | --- | --- | --- | --- | --- |
| IE1 | Inv. | 2100 | 140 | 159 | 246 | 330 | 330 | 312 |
| IE2 | Inv. | 2100 | 140 | 159 | 241 | 331 | 326 | 311 |
| IE3 | Inv | 2100 | 140 | 163 | 248 | 336 | 330 | 309 |
| IE4 | Inv | 2100 | 140 | 169 | 243 | 330 | 325 | 299 |
| IE5 | Inv | 2100 | 140 | 173 | 243 | 327 | 323 | 299 |

TABLE 3

Additional Information (Inventive Examples)

| LDPE Exs. | Peroxides | CTA | I2 dg/min$^{-1}$ | R2 and R3 Value* | Ethylene Conversion % |
| --- | --- | --- | --- | --- | --- |
| IE1 | TBPO/DTBP/TETMP | Acetone | 3.3 | 2.16 | 33.6 |
| IE2 | TBPO/DTBP/TETMP | Acetone | 2.0 | 2.16 | 33.4 |
| IE3 | TBPO/DTBP/TETMP | PA | 1.5 | ∞ | 32.3 |
| IE4 | TBPO/DTBP/TETMP | PA | 0.58 | ∞ | 29.3 |
| IE5 | TBPO/DTBP/TETMP | PA | 0.37 | ∞ | 27.6 |

*When R2 and R3 are 2.16, the flow scheme in FIG. 1 was used. In Inventive Example 3, 4 and 5, both Primary A and B (stream 2 and 3) were sent to stream 4.

Polymer properties are shown in Tables 4 and 5 below.

TABLE 4

Polymer Properties

| LDPE | Type* | I2 (dg/min) | Density (g/cc) | Mw(abs) (kg/mol)$^f$ | Mw(abs)/ Mn(abs)$^f$ | Melt Strength (cN) | G' (Pa) at 170° C.$^u$ | Fraction with MW above $1 \times 10^6$ g/mol$^f$ | Mw(abs)/ Mw(GPC)$^f$ | g'$^u$ |
|---|---|---|---|---|---|---|---|---|---|---|
| PG7004** | CE, AC | 4.1 | 0.9215 | 321 | 22.6 | 9.1 | 146 | 0.080 | 2.61 | 0.54 |
| LDPE 770G** | CE, AC | 2.3 | 0.918 | 433 | 26.2 | 14.8 | 183 | 0.106 | 2.99 | 0.55 |
| LDPE 662I** | CE, AC | 0.38 | 0.9182 | 872 | 46.1 | 30.0 | cnbm | 0.202 | 3.54 | 0.39 |
| LD310E** | CE, tub | 0.7 | 0.9231 | 144 | 8.3 | 14.0 | cnbm | 0.018 | 1.51 | 0.57 |
| LD410E** | CE, tub | 2.0 | 0.9242 | 121 | 6.7 | 6.3 | 89$^s$ | 0.009 | 1.50 | 0.57 |
| LD450E** | CE, tub | 2.0 | 0.9231 | 130 | 7.8 | 7.7 | 113$^s$ | 0.014 | 1.52 | 0.59 |
| IE1 | IE, tub | 3.3 | 0.9191 | 188 | 14.4 | 9.4 | 142 | 0.036 | 1.88 | 0.52 |
| IE2 | IE, tub | 2.0 | 0.9193 | 196 | 14.3 | 12.5 | 153 | 0.037 | 1.80 | 0.53 |
| IE3 | IE, tub | 1.5 | 0.9172 | 243 | 17.9 | 19.2 | 179 | 0.057 | 1.82 | 0.58 |
| IE4 | IE, tub | 0.58 | 0.9180 | 287 | 16.6 | 26.8 | cnbm | 0.066 | 1.92 | 0.57 |
| IE5 | IE, tub | 0.37 | 0.9180 | 297 | 17.5 | 29.9 | cnbm | 0.072 | 2.01 | 0.59 |

*CE: Comparative Example; IE: Inventive Example; AC: Autoclave-based; tub: Tubular.
**Commercial Polymers available from The Dow Chemical Company.
$^s$"170° C. data" is interpolated from 150° C. and 190° C. data.
$^f$All MWD and g' metrics in this table obtained from GPC Method A.
$^u$Software A was used to determine G'.

TABLE 5

Polymer Properties

| LDPE | I2 (dg/min) | Mw(abs) (kg/mol)$^f$ | Melt Strength (cN) | Fraction with M above $1.10^6$ g/mol$^f$ | A × [(I2)$^B$] (kg/mol)$^a$ | C × [(I2)$^D$] (cN)$^b$ | E × [(I2)$^F$] (wt fraction)$^c$ |
|---|---|---|---|---|---|---|---|
| PG7004 | 4.1 | 321 | 9.1 | 0.080 | 284 | 6.2 | 0.064 |
| 770G | 2.3 | 433 | 14.8 | 0.106 | 358 | 8.5 | 0.080 |
| 662i | 0.38 | 872 | 30.0 | 0.202 | 736 | 23.0 | 0.159 |
| LD310E | 0.7 | 144 | 14.0 | 0.018 | 577 | 16.4 | 0.126 |
| LD410E | 2.0 | 121 | 6.3 | 0.009 | 379 | 9.2 | 0.085 |
| LD450E | 2.0 | 130 | 7.7 | 0.014 | 379 | 9.2 | 0.085 |
| IE1 | 3.3 | 188 | 9.4 | 0.036 | 310 | 7.0 | 0.070 |
| IE2 | 2 | 196 | 12.5 | 0.037 | 379 | 9.2 | 0.085 |
| IE3 | 1.5 | 243 | 19.2 | 0.057 | 425 | 10.8 | 0.094 |
| IE4 | 0.58 | 287 | 26.8 | 0.066 | 622 | 18.2 | 0.135 |
| IE5 | 0.37 | 297 | 29.9 | 0.072 | 744 | 23.3 | 0.161 |

$^a$Mw(abs) < A × [(I2)$^B$], where A = 5.00 × 10$^2$ (g/mole)/(dg/min)$^B$, and B = −0.40 [Mw(abs), GPC Method A].
$^b$MS ≥ C × [(I2)$^D$], where C = 13.5 cN/(dg/min)$^D$, and D = −0.55 [Melt Strength = MS, 190° C.].
$^c$w < E × [(I2)$^F$], where E = 0.110 (dg/min)$^{-F}$, and F = −0.38.
$^f$All MWD metrics in this table obtain from GPC Method A.

Table 6 contains the branches per 1000 C as measured by $^{13}$C NMR. These LDPE polymers contain amyl, or C5 branches, which are not contained in substantially linear polyethylenes, such as AFFINITY Polyolefin Plastomers, or Ziegler-Natta catalyzed LLDPE, such as DOWLEX Polyethylene Resins, both produced by The Dow Chemical Company. Each inventive LDPE, shown in Table 6, contains greater than, or equal to, 2.0 amyl groups (branches) per 1000 carbon atoms. Table 7 contains unsaturation results by $^1$H NMR.

TABLE 6

Branching Results in branches per 1000C by $^{13}$C NMR of Inventive Examples and Comparative Examples.

| | C1 | 1,3 diethyl branches | C2 on Quat Carbon | C4 | C5 | C6+ |
|---|---|---|---|---|---|---|
| IE1 | ND | | 4.62 | 1.83 | 7.37 | 2.09 | 3.93 |
| IE2 | ND | | 5.11 | 1.49 | 6.65 | 2.04 | 3.92 |
| IE3 | ND | | 5.54 | 2.13 | 7.93 | 2.66 | 4.65 |
| IE4 | ND | | 4.93 | 1.68 | 7.32 | 2.17 | 3.40 |
| IE5 | ND | | 4.76 | 1.73 | 7.37 | 2.25 | 3.40 |

TABLE 6-continued

Branching Results in branches per 1000C by $^{13}$C NMR of Inventive Examples and Comparative Examples.

| | C1 | 1,3 diethyl branches | C2 on Quat Carbon | C4 | C5 | C6+ |
|---|---|---|---|---|---|---|
| AFFINITY PL 1880 | ND | ND | ND | ND | ND | 19.5* |
| DOWLEX 2045G | ND | ND | ND | ND | ND | 11.4* |

ND = not detected.
*The values in the C6+ column for the DOWLEX and AFFINITY samples represent C6 branches from octene only, and do not include chain ends.

TABLE 7

Unsaturation Results by $^1$H NMR

| | vinyl/ 1000C | cis and trans/ 1000C | trisub/ 1000C | vinylidene/ 1000C | total unsaturation/ 1000C |
|---|---|---|---|---|---|
| IE1 | 0.067 | 0.064 | 0.129 | 0.282 | 0.542 |
| IE2 | 0.059 | 0.060 | 0.115 | 0.259 | 0.493 |

TABLE 7-continued

Unsaturation Results by $^1$H NMR

| | vinyl/ 1000C | cis and trans/ 1000C | trisub/ 1000C | vinylidene/ 1000C | total unsaturation/ 1000C |
|---|---|---|---|---|---|
| IE3 | 0.068 | 0.057 | 0.136 | 0.295 | 0.554 |
| IE4 | 0.058 | 0.051 | 0.118 | 0.261 | 0.490 |
| IE5 | 0.054 | 0.051 | 0.107 | 0.254 | 0.470 |
| AFFINITY PL 1880 | 0.040 | 0.064 | 0.123 | 0.043 | 0.270 |
| DOWLEX 2045G | 0.283 | 0.049 | 0.042 | 0.055 | 0.430 |

B. Blend Compositions

Table 8 lists some examples of second ethylene-based polymers for use in the inventive compositions.

TABLE 8

Second Polymers

| Material | Description | I2 (dg/min) | Density (g/cc) |
|---|---|---|---|
| EO1* | ethylene-octene copolymer | 21.5 | 0.911 |
| EO2* | ethylene-octene copolymer | 15.0 | 0.912 |
| EO3* | ethylene-octene copolymer | 15.0 | 0.910 |
| LDPE 751A | LDPE | 6.4 | 0.926 |
| AMPLIFY EA103 | EEA (ethylene-ethylacrylate) copolymer | 19.5 | 0.927 |
| ASPUN 6835A | higher density ethylene-octene copolymer | 17.0 | 0.950 |

The blend components were compounded using an "18 mm" twin screw extruder (micro-18). The twin screw extruder was a Leistritz machine controlled by HAAKE software. The extruder had five heated zones, a feed zone, and a "3 mm" strand die. The feed zone was cooled by flowing river water, while the remaining zones 1-5 and die were electrically heated and air cooled to 120, 135, 150, 190, 190, and 190° C., respectively. The pelletized polymer components were combined in a plastic bag, and tumble blended by hand. After preheating the extruder, the load cell and die pressure transducers were calibrated. The drive unit for the extruder was run at 200 rpm, which resulted by gear transfer to a screw speed of 250 rpm. The dry blend was then fed (6-8 lbs/hr) to the extruder through a twin auger K-Tron feeder (model # K2VT20) using pellet augers. The hopper of the feeder was padded with nitrogen, and the feed cone to the extruder was covered with foil, to minimize air intrusion, to minimize possible oxygen degradation of the polymer. The resulting strand was water quenched, dried with an air knife, and pelletized with a Conair chopper.

A first set of blend compositions was made using EO1 with either LDPE 770G or IE3 in various blend ratios. Table 9 shows rheological and molecular weight properties of these blends. LDPE 770G was used, in practice, as a blend component in extrusion coating with second components, such as EO1. It was discovered that the blend containing IE3, at a weight ratio of 70/30, had similar Melt Strength, as compared to the comparative example containing LDPE 770G (70/30 weight ratio), but also has a higher G' value.

Furthermore, the Melt Strength (MS), and consequently, the G' value (storage modulus), for the inventive blend can be further optimized by varying the blend ratio.

TABLE 9

Properties of blend compositions (each percent in wt %)

| Blend composition | I2 (dg/ min) | Density (g/cc) | Melt Strength (cN) | G' (Pa) (170° C.)$^u$ | Mw (conv) (kg/ mol)$^r$ | Mw (conv)/ Mn (conv)$^r$ | Mz (conv)/ Mw (conv)$^r$ |
|---|---|---|---|---|---|---|---|
| 70% EO1 + 30% 770G | 12.1 | 0.911 | 4.2 | 96 | 85.7 | 5.03 | 4.75 |
| 80% EO1 + 20% IE3 | 15.1 | 0.910 | 2.7 | 84 | 64.8 | 3.85 | 3.14 |
| 70% EO1 + 30% IE3 | 11.4 | 0.911 | 4.2 | 111 | 73.7 | 4.32 | 3.43 |
| 60% EO1 + 40% IE3 | 8.9 | 0.912 | 6.4 | 134 | 82.4 | 4.80 | 3.43 |

$^r$All MWD metrics in this table obtained from GPC Method B.
$^u$Software B was used to determine G'.

A second set of blends was made using LDPE 751A, with either LDPE 770G or IE3 in various blend ratios. Table 10 shows rheological and molecular weight properties of the blends. It was discovered that the blend containing IE3, at a weight ratio of 80/20, had a higher Melt Strength as compared to the comparative example containing LDPE 770G (80/20). These blends have a density of about 0.923 g/cc, and, in view of their I2 and Melt Strength (MS), are suitable for coating applications. However, the inventive blends reach the desired melt strength at a lower blend ratio (less inventive IE3). Furthermore, the Melt Strength for the inventive blend can be further optimized by varying the blend ratio.

TABLE 10

Properties of blend compositions (each percent in wt %)

| Blend composition | I2 (dg/ min) | Density (g/cc) | Melt Strength (cN) | Mw (conv) (kg/ mol)$^r$ | Mw (conv)/ Mn (conv) | Mz (conv)/ Mw (conv) |
|---|---|---|---|---|---|---|
| 80% LDPE 751A + 20% 770G | 5.2 | 0.923 | 6.6 | 115 | 6.92 | 3.90 |
| 80% LDPE 751A + 20% IE3 | 5.2 | 0.923 | 7.0 | 105 | 6.32 | 3.33 |
| 70% LDPE 751A + 30% IE3 | 4.0 | 0.922 | 8.2 | 110 | 6.67 | 3.25 |
| 60% LDPE 751A + 40% IE3 | 3.7 | 0.922 | 9.0 | 112 | 7.16 | 3.33 |

$^r$All MWD metrics in this table obtained from GPC Method B.

A third set of blends was made using EO2 with LD410E, LD450E, or IE3, in various blend ratios. Table 11 shows rheological and molecular weight properties of the blends. It was discovered that the blends containing IE3 show significantly higher Melt Strength (MS) and G' values than the blends containing LD410E or LD450E, at similar melt index (I2). LD450E is a resin especially designed for foam applications, where high Melt Strength is required. Here the blends containing IE3 had significantly higher Melt Strength (MS) and G' values than the blend compositions that did not contain IE3. Also, the blend composition containing only 20 wt % of IE3 achieved a higher Melt Strength (MS) and a higher G' values, as compared to the respective blend compositions that contain 40 wt % each of LD410E and LD450E, despite the higher melt index of the blend composition containing IE3. These unexpected results provide for new coating compositions that require less LDPE, and which have improved Melt Strength (MS) and G' values, and which also lead to better maintenance of good mechanical properties and sealing properties associated with the second polymer component.

TABLE 11

Properties of blend compositions (each percent in wt %)

| Blend composition | I2 (dg/min) | Density (g/cc) | Melt Strength (cN) | G' At 170° C. (Pa)$^u$ | Mw (conv) (kg/mol)$^t$ | Mw (conv)/Mn (conv)$^t$ | Mz (conv)/Mw (conv)$^t$ |
|---|---|---|---|---|---|---|---|
| 80% EO2 + 20% LD410E | 11.0 | 0.913 | 0.4 | 48 | 56.9 | 2.98 | 2.07 |
| 70% EO2 + 30% LD410E | 9.2 | 0.915 | 0.5 | 59 | 58.7 | 2.93 | 2.15 |
| 60% EO2 + 40% LD410E | 7.2 | 0.916 | 2.0 | 71 | 61.4 | 3.06 | 2.18 |
| 80% EO2 + 20% LD450E | 10.8 | 0.914 | 0.5 | 53 | 60.2 | 3.15 | 2.52 |
| 70% EO2 + 30% LD450E | 9.1 | 0.915 | 2.0 | 67 | 59.3 | 3.02 | 2.11 |
| 60% EO2 + 40% LD450E | 7.0 | 0.916 | 2.8 | 76 | 67.8 | 3.51 | 2.79 |
| 80% EO2 + 20% IE3 | 10.4 | 0.913 | 3.7 | 84 | 68.0 | 3.51 | 3.02 |
| 70% EO2 + 30% IE3 | 7.5 | 0.913 | 6.4 | 112 | 76.9 | 4.08 | 3.15 |
| 60% EO2 + 40% IE3 | 5.9 | 0.914 | 9.0 | 135 | 89.0 | 5.27 | 3.33 |

$^t$ All MWD metrics in this table obtain from GPC Method B.
$^u$Software B was used to determine G'.

A fourth set of blends was made using IE3 in various blend ratios with AMPLIFY EA 103. Table 12 shows rheological and molecular weight properties of these blends. It was discovered that the blends with IE3 showed Melt Strength (MS) values suitable for extrusion coating. Through the use of AMPLIFY EA 103, as a secondary blend component, ethyl acrylate polar functionality has been incorporated into the blend composition.

TABLE 12

Properties of blend compositions (percents in wt %)

| Blend composition | I2 (dg/min) | Density (g/cc) | Melt Strength (cN) | Mw (conv) (kg/mol)$^t$ | Mw (conv)/Mn (conv)$^t$ | Mz (conv)/Mw (conv)$^t$ |
|---|---|---|---|---|---|---|
| 80% AMPLIFY EA 103 + 20% IE3 | 10.8 | 0.927 | 2.9 | 82.3 | 5.37 | 3.45 |
| 70% AMPLIFY EA 103 + 30% IE3 | 9.0 | 0.925 | 3.8 | 85.9 | 5.31 | 3.28 |
| 60% AMPLIFY EA 103 + 40% IE3 | 6.9 | 0.925 | 6.4 | 93.7 | 6.10 | 3.24 |

$^t$All MWD metrics in this table obtain from GPC Method B.

A fifth set of blends was made using IE3 in various blend ratios with ASPUN 6835A. Table 13 shows rheological and molecular weight properties of these blends. It was discovered that the blends with IE3 show Melt Strength (MS) and G' values suitable for extrusion coating, at increased density of the blend composition.

TABLE 13

Properties of blend compositions (each percent in wt %)

| Blend composition | I2 (dg/min) | Density (g/cc) | Melt Strength (cN) | G' at 170° C. (Pa) | Mw (conv) (kg/mol)$^t$ | Mw (conv)/Mn (conv)$^t$ | Mz (conv)/Mw (conv)$^t$ |
|---|---|---|---|---|---|---|---|
| 80% ASPUN 6835A + 20% IE3 | 10.6 | 0.944 | 3.35 | 85 | 71.4 | 4.16 | 3.18 |
| 70% ASPUN 6835A + 30% IE3 | 8.1 | 0.940 | 5.9 | 115 | 80.8 | 4.87 | 3.6 |

TABLE 13-continued

Properties of blend compositions (each percent in wt %)

| Blend composition | I2 (dg/min) | Density (g/cc) | Melt Strength (cN) | G' at 170° C. (Pa) | Mw (conv) (kg/mol)$^t$ | Mw (conv)/Mn (conv)$^t$ | Mz (conv)/Mw (conv)$^t$ |
|---|---|---|---|---|---|---|---|
| 60% ASPUN 6835A + 40% IE3 | 6.3 | 0.937 | 8.4 | 135 | 88.5 | 5.37 | 3.34 |

$^t$All MWD metrics in this table obtain from GPC Method B.
u) Software B was used to determine G'.

A sixth set of blend compositions was made using EO3 with either LDPE 662i or IE4 or IE5 in a blend ratio of 85% EO3 and 15% LDPE. Table 14 shows rheological and molecular weight properties of these blends. LDPE 662i was used, in practice, as a blend component in extrusion coating with second components, such as EO3. It was discovered that the blend containing IE4 or IE5 had similar or higher Melt Strength as compared to the comparative example containing LDPE 662i.

TABLE 14

Properties of blend compositions (each percent in wt %)

| Blend composition | I2 (dg/min) | Density (g/cc) | Melt Strength (cN) | Mw (conv) (kg/mol)[f] | Mw (conv)/Mn (conv)[f] | Mz (conv)/Mw (conv)[f] |
|---|---|---|---|---|---|---|
| 85% EO3 + 15% 662i | 9.6 | 0.913 | 3.4 | 76.6 | 3.92 | 5.03 |
| 85% EO3 + 15% IE4 | 9.5 | 0.913 | 3.7 | 67.4 | 3.68 | 3.74 |
| 85% EO3 + 15% IE5 | 9.3 | 0.913 | 4.1 | 63.5 | 3.45 | 3.54 |

[f]All MWD metrics in this table obtained from GPC Method B.

C. Extrusion Coatings

Monolayer extrusion coatings were performed at following temperature settings: Extruder Barrel—200/250/280/290/290/290° C.; Flange/Adapter/Piping—290° C. (6 zones); and Die—290° C.×10 Zones.

The blend compositions were extruded on a "3.5 inch" diameter screw, with a length over diameter (L/D) ratio of 32, onto 70 g/m² Kraft paper, in an amount (coating weight) of 25 g/m². Melt pressure and melt temperature were recorded with thermocouples placed in the adapter. The melt was delivered through a Davis Standard/Er-We-Pa flex lip edge bead reduction die, Series 510A, nominally set to a die gap of 0.6 mm. The melt drawing and application of the melt vertically onto the moving substrate was performed at an air gap of 250 mm and a nip off-set of 15 mm, towards the pressure roll. The melt was applied onto the moving substrate in the laminator nip, which is the contact point of the pressure roll, with a rubber surface layer contacting the "water cooled" chill roll with a matte surface finish, and maintained at a temperature of 15° C. to 20° C. The air gap was defined as the vertical distance between the die lip and the laminator nip. The nip off-set was defined as the horizontal off-set of the die lip position relative to the laminator nip. Dry blends were prepared using a Maguire WSB-240T gravimetric blending unit (at room temperature), permitting controlled weight percentages of respective blend components, prior to extrusion.

Various fixed line speeds (100 m/min and 300 m/min) were used to determine the neck-in, at coating weights of 15 g/m² and 25 g/m². Draw down is defined as the maximum line speed attainable before web breakage or web defects/edge inconsistencies occur, when accelerating the line speed at a constant polymer output. The constant polymer output level is set by a coating weight of 15 g/m² running at 100 m/min line speed. Neck-in is the difference between the final width of the web and the die width at fixed line speed. Lower neck-in and higher draw down are both very desirable. Lower neck-in indicates better dimensional stability of the web, which, in turn, provides for better control of the coating onto the substrate. Higher draw down indicates higher line speed capability, which, in turn, provides for better productivity. Neck-in and draw down results are shown in Table 15 for blends of EO1 with LDPE 770G or IE3.

The blend compositions, based on 30 wt % LDPE 770G (autoclave) as minor component, had low neck-in, and were applied in extrusion coating applications. Typically it is difficult to achieve low neck-in with tubular LDPE. IE3 was shown to have similar Melt Strength (MS) as 770G, with, and without, EO1. It has been discovered that IE3 leads to similarly or improved coating performance, as the AC-based blend benchmark (EO1/770G blend). The inventive compositions provide good extrusion coatings, even at lower Mw(conv), as compared to the AC-based example (EO1/770G blend). The inventive compositions can be made on a tubular reactor train, with improved conversion levels and lower energy input, as compared to autoclave processes. Furthermore, the inventive compositions make it possible to produce high clarity film and extrusion coatings. For high clarity film applications, gel levels should be extremely low. To achieve low gel levels, a crosslinking agent is not typically desired, and/or a comonomer with crosslinking capability is not typically desired, in the formation of the polymer, especially at low melt index.

TABLE 15

Extrusion coating properties of blend compositions

| Blend composition | Neck-in 290° C.; 25 g/m²; 100 m/min (mm) | Neck-in 290° C.; 25 g/m²; 300 m/min (mm) | Neck-in 290° C.; 15 g/m²; 100 m/min (mm) | Draw-down 290° C. (m/min)* |
|---|---|---|---|---|
| 70% EO1 + 30% 770G | 114 | 137 | 110 | 300 |
| 80% EO1 + 20% IE3 | 172 | 160 | 175 | 467 |
| 70% EO1 + 30% IE3 | 137 | 118 | 121 | 432 |
| 60% EO1 + 40% IE3 | 105 | 106 | 102 | 340 |

*Starting at a coating weight of 15 g/m²

Comparative compositions containing EO2 and LD410E or LD450E, could not be fabricated into good coating webs due to low Melt Strength (MS), which would result in excessive neck-in. Table 16 shows coating results for the blends of EO2 with IE3, which shows good neck-in data and excellent draw-down values.

TABLE 16

Extrusion coating properties of blend compositions

| Blend composition | Neck-in 290° C.; 25 g/m²; 100 m/min (mm) | Neck-in 290° C.; 25 g/m²; 300 m/min (mm) | Neck-in 290° C.; 15 g/m²; 100 m/min (mm) | Draw-down 290° C. (m/min)* |
|---|---|---|---|---|
| 80% EO2 + 20% IE3 | 156 | 162 | 153 | 450 |
| 70% EO2 + 30% IE3 | 109 | 118 | 108 | 335 |
| 60% EO2 + 40% IE3 | 100 | 103 | 93 | 250 |

*Starting at a coating weight of 15 g/m² at 100 mpm line speed.

Figure 6:
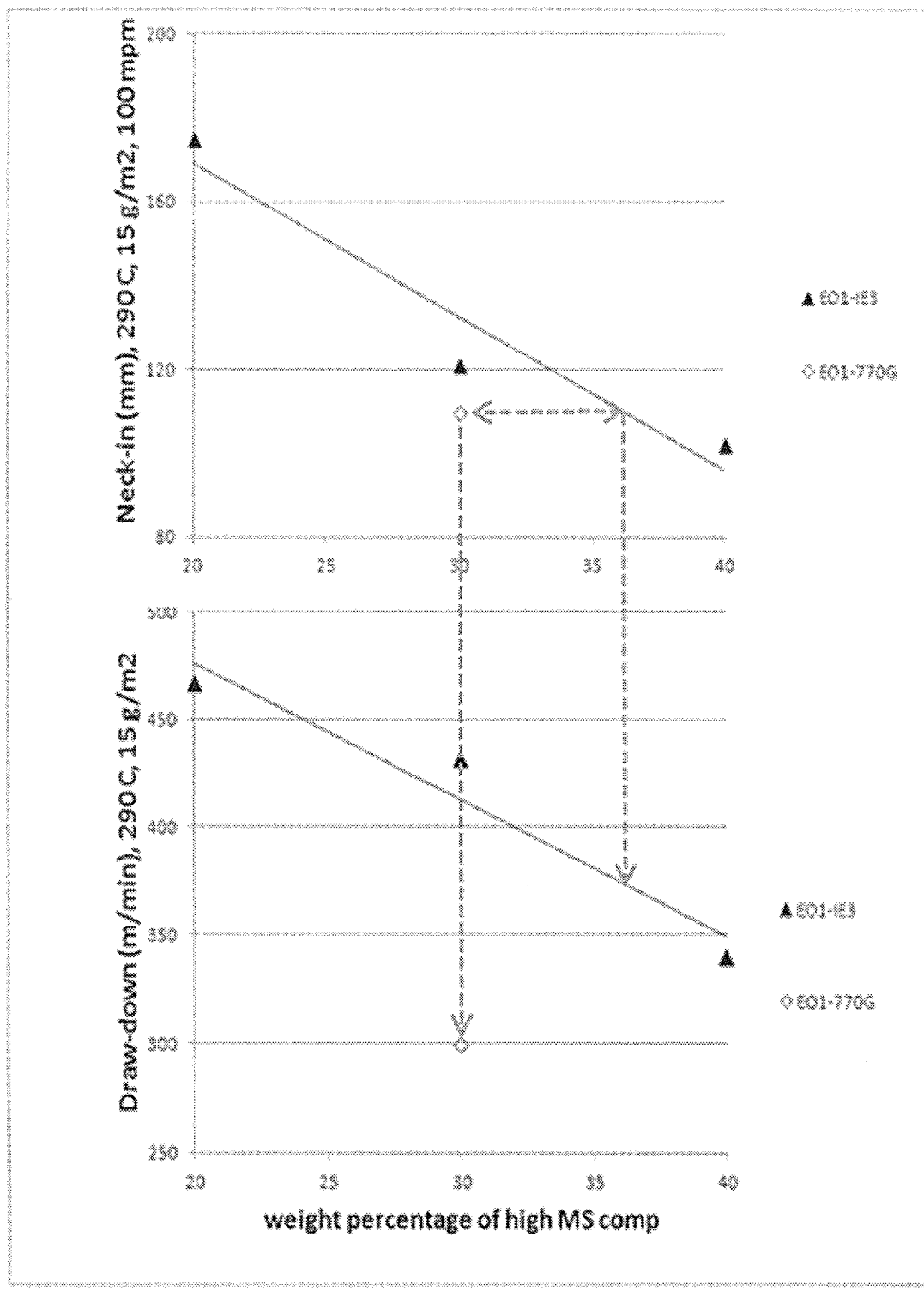
FIG. 6 is a dual profile depicting the "Neck-in versus weight percentage of high MS polymer component" and the "Draw down versus weight percentage of high MS polymer component" for inventive and comparative blend compositions.

As seen in FIG. 6, blend compositions containing IE3 have significantly better (higher) draw-down, as compared to the blend compositions containing the LDPE 770G. The neck-in performance will depend on the weight ratio of polymer components in the blend and the particular polymer components. Blend compositions containing IE3 have comparable neck-in values at the same weight ratio. In addition, the neck-in value can be further improved by adjusting the weight ratio of the polymer components, while maintaining better draw down performance.

Additional monolayer extrusion coatings were performed on a Black-Clawson extrusion coating/lamination line. An extruder with 150 horsepower and 3.5 inch diameter screw was used at screw speeds of approximately 90 rpm, resulting in 114 kg/h (250 lb/h) polymer output. Temperature in each zone of the extruder was 177, 232, 288, and 316° C. (350, 450, 550 and 600° F.), respectively, leading to a target melt temperature of 320° C. The nominal die width of 76 cm (30 inches) was deckled to an open die width of 61 cm (24 inches). The width of the Kraft paper was 61 cm (24 inches). A 15 cm air gap was used, with line speeds of 134 m/min (440 fpm) and 268 m/min (880 fpm), resulting in 25 micron (1 mil) and 13 micron (0.5 mil) coatings respectively. Neck-in and draw-down were determined in the same way as with the coating method described above. The maximum speed used was 457 m/min (1500 fpm). Blends of the various components were produced by weighing out the pellets, and then tumble blending samples, until a homogeneous blend was obtained (approximately 30 minutes for each sample). Neck-in and draw down results are shown in Table 17 for blends of EO3 with LDPE 662i or IE4 or IE5.

The blend compositions based on 15 wt % LDPE 662i (autoclave) as minor component had low neck-in. Typically it is difficult to achieve low neck-in with tubular LDPE. IE4 and IE5 were shown to have similar Melt Strength (MS) as 662i, with, and without, EO3. It has been discovered that the blend of high melt index, linear low-density ethylene-octene copolymer with a low level of tubular LDPE (e.g., IE5) leads to satisfactory coating performance, comparable to the benchmark AC-based blend (EO3/662i blend). One skilled in the art can further optimize the neck-in/draw-down balance by adjusting the blend ratio. In particular, neck-in improvement can be achieved by incremental increases in the amount of a suitable LDPE component.

TABLE 17

Extrusion coating properties of blend compositions

| Blend composition | Neck-in 320° C.; 25 micron; 134 m/min (cm) | Neck-in 320° C.; 13 micron; 268 m/min (cm) | Draw-down 320° C. (m/min)* |
|---|---|---|---|
| 85% EO3 + 15% 662i | 6.4 | 5.4 | >457 |
| 85% EO3 + 15% IE4 | 8.9 | 9.8 | >457 |
| 85% EO3 + 15% IE5 | 7.3 | 6.0 | >457 |

*Starting at a coating thickness of 13 micron at 268 m/min line speed.

The invention claimed is:

1. A composition comprising a first ethylene-based polymer, formed by a high pressure, free-radical polymerization process, and comprising the following properties:
   a) a Mw(abs) versus I2 relationship: $Mw(abs) < A \times [(I2)^B]$, where $A = 5.00 \times 10^2$ (kg/mole)/(dg/min)$^B$, and $B = -0.40$; and
   b) a MS versus I2 relationship: $MS \geq C \times [(I2)^D]$, where $C = 13.5$ cN/(dg/min)$^D$, and $D = -0.55$, and
   wherein the first ethylene-based polymer has a density from 0.910 to 0.940 g/cc.

2. The composition of claim 1, wherein the first ethylene-based polymer has a melt index (I2) from 0.3 to less than 4.0 g/10 min.

3. The composition of claim 1, wherein the first ethylene-based polymer has a melt strength greater than, or equal to, 9.0 cN (at 190° C.).

4. The composition of claim 1, wherein first ethylene-based polymer has a "weight fraction (w) of molecular weight greater than $10^6$ g/mole, based on the total weight of polymer, as determined by GPC(abs)," that meets the following relationship: $w < E \times [(I2)^F]$, where $E = 0.110$ (dg/min)$^{-F}$, and $F = -0.38$.

5. The composition of claim 1, wherein first ethylene-based polymer is polymerized in at least one tubular reactor.

6. The composition of claim 1, wherein the composition further comprises a second ethylene-based polymer.

7. The composition of claim 6, wherein the composition has a melt index (I2) from 2 to 50 g/10 min.

8. The composition of claim 6, wherein the composition has a density from 0.900 to 0.955 g/cc.

9. The composition of claim 6, wherein the composition has a MS value greater than, or equal to, 2.5 cN (at 190° C.).

10. The composition of claim 6, wherein the composition comprises greater than 0 wt % but less than 40 wt % of the first ethylene-based polymer, based on the sum of the weight of the first and second polymers, and wherein the composition has a G' value greater than, or equal to, 80 Pa (at 170° C.).

11. The composition of claim 6, wherein the second ethylene-based polymer comprises at least one comonomer selected from a C3-C20 alpha-olefin, an acrylate, an acetate, a carboxylic acid, carbon monoxide, or an ionomer.

12. The composition of claim 6, wherein the second ethylene-based polymer is selected from an ethylene/alpha-olefin copolymer, a low density polyethylene (LDPE), a high density polyethylene (HDPE), or a combination thereof.

13. An article comprising at least one component formed from the composition of claim 1.

14. The article of claim 13, wherein the article is a coating, a film, a foam, a laminate, a fibers, or a tape.

15. A method for forming the composition of claim 1, said method comprising polymerizing ethylene in a reactor configuration that comprises at least one tubular reactor.

* * * * *